US005536008A

United States Patent [19]
Clapper, Jr.

[11] Patent Number: 5,536,008
[45] Date of Patent: * Jul. 16, 1996

[54] ELECTRONIC GAMING APPARATUS AND METHOD

[76] Inventor: Ronald C. Clapper, Jr., 20753 Horace St., Chatsworth, Calif. 91311

[*] Notice: The portion of the term of this patent subsequent to May 6, 2012, has been disclaimed.

[21] Appl. No.: 306,130

[22] Filed: Sep. 14, 1994

Related U.S. Application Data

[63] Continuation-in-part of Ser. No. 999,268, Nov. 16, 1992, Pat. No. 5,377,975, which is a continuation-in-part of Ser. No. 879,747, May 6, 1992, Pat. No. 5,348,299.

[51] Int. Cl.⁶ ....................................................... A63F 9/24
[52] U.S. Cl. ................................................................ 463/16
[58] Field of Search .............................. 273/138 A, 139, 273/143 R; 221/2, 8, 30, 32

[56] References Cited

U.S. PATENT DOCUMENTS

| 4,373,726 | 2/1983 | Churchill | 273/138 A |
| 4,817,949 | 4/1989 | Bachman | 273/139 |

FOREIGN PATENT DOCUMENTS

| 52-37098 | 3/1977 | Japan | 221/30 |
| 2261097 | 5/1993 | United Kingdom | 273/138 A |

Primary Examiner—Benjamin H. Layno
Attorney, Agent, or Firm—Robert J. Schaap

[57] ABSTRACT

An electronic gaming apparatus which preferably corresponds to and effectively electronically automates games of chance as, for example, that game of chance known as "Pull-Tab." A primary strip comprised of a suitable substrate is provided in the apparatus. The primary strip of substrate may be in the form of an individual ticket or coupon which is dispensed from the gaming apparatus. Otherwise, a strip segment may be severed from a roll of the primary strip to provide an individual ticket. In each case, indicia in the form of icons is printed on a front face of each of the individual tickets or on each of a plurality of locations of the primary strip. If the indicia on the ticket corresponds to a winning indicia, then the player would win the game or a round of the game. Each individual ticket is provided with a code on the opposite surface thereof and where the code on a ticket corresponds to the indicia on that ticket, except that the code is only in machine readable format. Thus, as the ticket is dispensed, the code is read and indicia is generated on a monitor of the apparatus to display representations of the indicia on the ticket. In one embodiment of the invention, a duplicate or secondary strip is provided along with the primary strip so that the player of the game removes the secondary cover strip in order to observe the indicia.

25 Claims, 6 Drawing Sheets

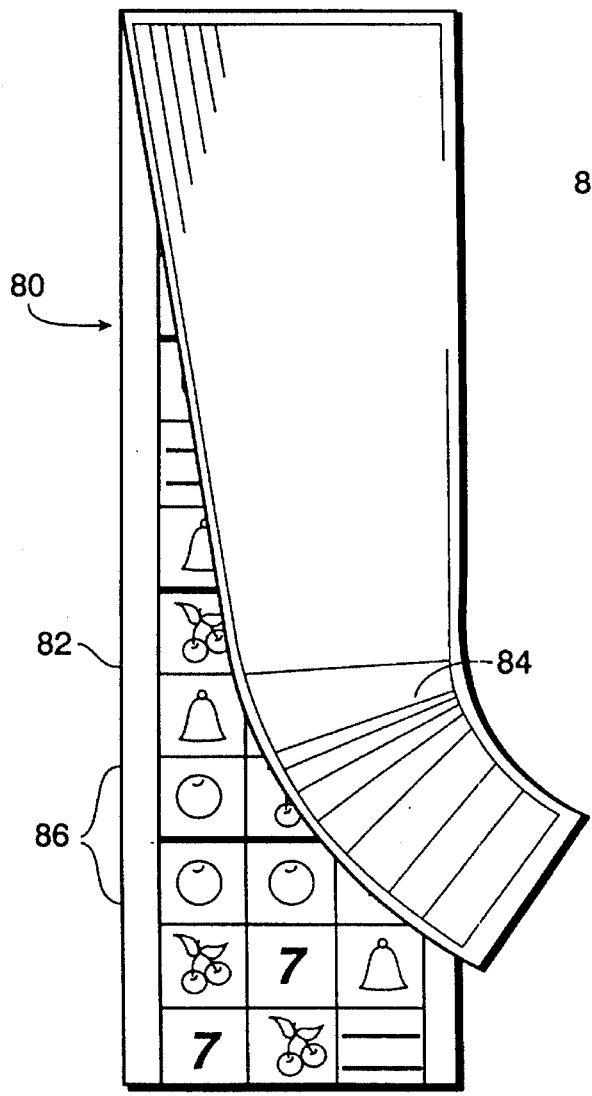
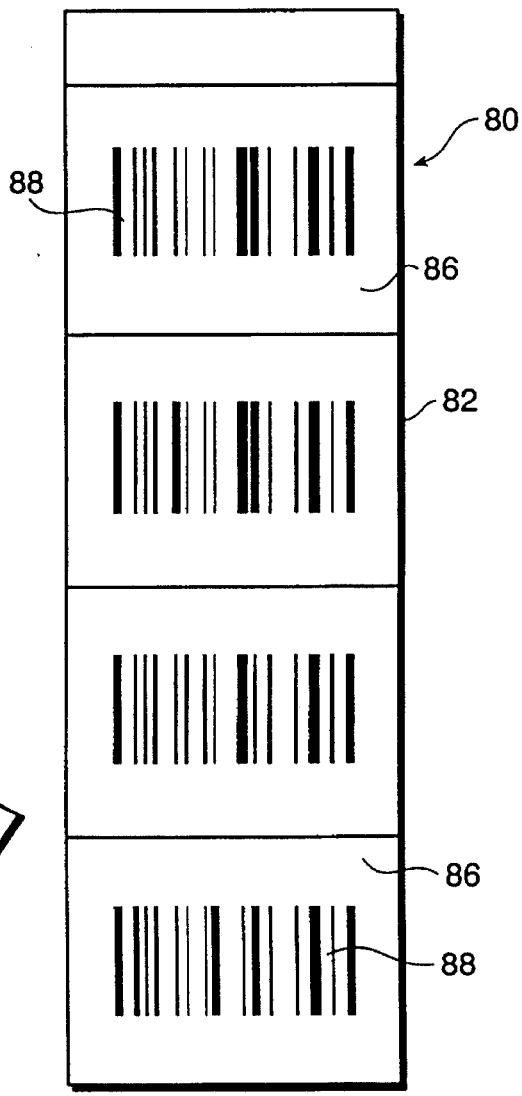
FIG. 6  FIG. 7

ELECTRONIC GAMING APPARATUS AND METHOD

RELATED APPLICATION

This application is a continuation-in-part of my patent application Ser. No. 999,268, filed Nov. 16, 1992, U.S. Pat. No. 5,377,975, which is, in turn, a continuation-in-part of my U.S. patent application Ser. No. 879,747, filed May 6, 1992, U.S. Pat. No. 5,348,299, entitled "Electronic Gaming Apparatus and Method."

BACKGROUND OF THE INVENTION

1. Field of the Invention

This invention relates in general to certain new and useful improvements in electronic gaming apparatus and a method of playing a game of chance and, more particularly, to a gaming apparatus which is capable of dispensing selected tickets containing indicia and generating indicia from a machine readable code on the ticket for display of the indicia corresponding to that on the ticket.

2. Brief Description of Related Art

With the recent advances in electronic circuitry, there have been many attempts to automate games and particularly, games of gambling which were heretofore played with little or no electronic game operation. These attempts to automate games have become even more pronounced in view of the recent advances in miniature microprocessor technology.

One of the games, for example, which was previously played without any type of electronic interaction was the game of poker. This necessarily involved a dealer and a plurality of players utilizing playing cards. Recently, however, the game of poker has been automated and can literally be played by actuating selected combinations of push buttons on an electronic gaming device which includes a display screen. Other games involving playing cards have also been automated so as to enable playing on an electronic game apparatus of this type.

In the conventional game of Pull-Tab, frequently played in gaming establishments, a large number of cards, or similar substrates, are located in a box or other open container. Each of the cards are printed with some type of indicia which may be a number, a symbol or the like and only a limited number of the cards in this box or other container have a winning indicia. Each of the indicia are covered by a removable cover sheet having a tab thereon and hence, the cards are referred to as "Pull Tabs."

A dealer, upon appropriate payment by a player, will remove one of the cards from the container and provide the same to a player. Since the indicia are covered by the removable cover sheet, and since the card with winning indicia are randomly located within the container, neither the dealer nor the player know if the player is receiving a card or ticket with a winning indicia until such time as the tab is engaged and the cover sheet is removed.

There is no prior art electronic gaming apparatus which is capable of dispensing a pre-printed ticket used in a game of chance and where the ticket has indicia thereon to determine if the receiver of the ticket wins a game or attains a score in the game and which also generates a display of the indicia on the ticket. More specifically, there is no prior art apparatus of this type in which a machine readable code on the ticket can be used to generate a display of the indicia on the ticket to be dispensed to a player.

The present invention relies on an innovation which electronically enhances this game of Pull Tab and other similar games which utilize selection of randomly arranged substrates having indicia thereon. This present invention is also applicable to the automating of various other types of games, including games of playing cards, as hereinafter described, and is particularly adaptable to games which have a plurality of substrates bearing indicia thereon in the nature of playing cards or the cards used in a game of chance.

OBJECTS OF THE INVENTION

It is therefore, one of the primary objects of the present inventions to provide an electronic gaming apparatus which is capable of dispensing tickets which contain pre-printed indicia and where certain of the indicia may represent a winning indicia.

It is another object of the preset invention to provide a gaming apparatus of the type stated in which tickets to be dispensed contain a code capable of being read and converted for electronic display of the indicia contained on the dispensed ticket.

It is a further object of the present invention to provide a gaming apparatus which automates a game of gambling previously played with a plurality of playing tickets in a container and adapted for dispensing from the container.

It is also an object of the present invention to provide a gaming apparatus of the type stated in which a machine readable code is located in association with a ticket to be dispensed and with the indicia located on a side thereof and where the machine readable code can be used to recreate the indicia on the display of a monitor while the ticket containing the indicia is dispensed to a player.

It is an additional object of the present invention to provide a gaming apparatus of the type stated which can be constructed at a relatively low cost and which is highly adaptable for the playing of a number of games which heretofore were played in an unautomated fashion.

It is another salient object of the present invention to provide a gaming apparatus of the type stated which enables a play of a game involving a betting activity and which is based only on the automation of a previously existing game which does not involve random selection in the gaming apparatus itself and thereby enables the play of a game in many locations where other forms of gaming activities are prohibited.

It is an additional object of the present invention to provide a method of automating a game previously played with playing pieces or substrates dispensed from an open container.

It is still another object of the present invention to provide a method of playing a game involving the dispensing of a ticket containing indicia and which may or may not contain winning indicia and which also includes a machine readable code for generating a display of the indicia on a dispensed ticket.

With the above and other objects in view, my invention resides in the novel features of form, construction, arrangement and combinations of parts presently described and pointed out in the claims.

BRIEF SUMMARY OF THE DISCLOSURE

The present invention relates to an electronic gaming apparatus, which in a broad aspect, is capable of dispensing a segment of a strip containing indicia thereon upon actuation of the apparatus. In a more preferred aspect, this apparatus maintains a duplicate record of the dispensed segment and particularly the indicia on that dispensed segment.

The electronic gaming apparatus contains a primary strip which can be subdivided into individual segments and where each strip segment contains the indicia thereon. This strip may be in the form of a roll containing the segments and where each segment is capable of being dispensed. The apparatus also comprises a duplicate or secondary strip containing indicia thereon in substantially the same location as on the primary strip. The apparatus further comprises means for severing a segment of the primary strip and dispensing the same upon actuation of the apparatus. This apparatus will store a corresponding portion of the duplicate strip as, for example, on a take-up roll thereof.

There is provided a separating means which separates the primary strip from the duplicate strip after actuation of the apparatus. In addition, a separate means for dispensing is provided which dispenses the substrate segment or so-called "game card" or "ticket" after cutting from the primary strip. The cutting means may be in the form of an anvil and a cutting blade.

In a further embodiment of the invention, the electronic gaming apparatus is also capable of dispensing a segment of a strip containing indicia thereon and which simultaneously displays the indicia of the dispensed segment. This embodiment of the apparatus further includes a means for severing a segment of a primary strip and dispensing the same upon actuation of this apparatus. Further, the apparatus includes means for simultaneously displaying the indicia on the dispensed segment.

The present invention, in another embodiment, also discloses a stack or group of individual pre-cut tickets or strips and each of which also contain indicia thereon and only some of which may contain winning indicia. In this case, the tickets are dispensed from a tray or holder of the tickets to a user upon actuation of the apparatus.

The rear surface, that is, the uncovered surface, of the ticket may contain the machine readable code, such as a bar code. Thus, the indicia will be covered by the cover or secondary strip which is capable of being removed therefrom so that the user may observe the indicia on the ticket and determine whether or not the indicia is a winning indicia.

In each embodiment of the apparatus, there is provided a display screen on the apparatus for displaying the indicia. The machine readable code, corresponding to the indicia, is preferably imprinted on the opposite side of the ticket which contains the indicia and the apparatus includes a scanning means for scanning the code and a processor for conversion and display of the indicia.

Preferably, the rear surface of the tickets will contain the indicia, that is, the side of the ticket in facewise contact with the secondary or cover strip. The forward surface of the secondary or cover strip may also have the same indicia as on the ticket and is in precisely the same location. In another embodiment of the invention, the rear surface of the strip may contain the code which is readable by a scanner. Thus, and in this respect, the secondary or cover strip will serve as a type of tab and moreover, a tab which is stored. The apparatus of the invention will remove the tab from the ticket for the user.

By virtue of the fact that the indicia on the primary strip are in facewise contact with the secondary strip, the indicia will always be in unknown to anyone who is playing the apparatus or even monitoring the play of the apparatus until the cover strip is separated from the ticket. The bar code is not readable by the user or observer of the apparatus since the code is only machine readable.

In a more specific form, the electronic gaming apparatus is constructed so that a player may win or lose based on the indicia on the dispensed substrate or substrate segment such that if the indicia correspond to a winning indicia, the player will win. In like manner, if the indicia on the dispensed substrate strip do not correspond to the winning indicia, the player will lose. Thus, the player may actuate the apparatus on numerous occasions in order to enable dispensing tickets containing indicia to increase the probability of obtaining a ticket containing a winning indicia.

On each occasion, the player is usually required to deposit the necessary amount of money in order to actuate the apparatus and thereby play the game. For this latter purpose, the gaming apparatus will be provided with a money-receiving mechanism which will read the money and permit actuation of the game if a proper amount of money has been so deposited. In like manner, the money mechanism may be in the form of a conventional coin mechanism if the game is to be played with coins, or in the form of a bill-reading and accepting mechanism if the game is to be played with paper currency denominations.

The ticket containing strip has a plurality of locations of indicia are provided as indicated above. As also indicated, some of the locations, and only a limited number of the locations, would contain the winning indicia. The locations in which the indicia correspond to a winning indicia are randomly located throughout the locations on the strip.

While the present invention is highly effective in enabling the play of the game of Pull-Tab, it is also not so limited. The gaming apparatus of the invention is essentially effective in the play of various games, whether or not gambling games, which operate on the basis of dispensing of a substrate as, for example, playing cards or the like. In this case, the apparatus will maintain a duplicate record so that the players themselves can actually examine the record in order to determine what transactions have taken place and to maintain a written memorialization thereof. Further, this gaming apparatus also immediately and automatically provides a display so that all members playing the game can observe the display. For this purpose, the display may be interrupted if desired, particularly if it is necessary to maintain in confidence the indicia on the substrate segment dispensed to any one player.

The present invention thereby provides a unique and novel electronic gaming apparatus which satisfies and fulfills all of the above-identified objects and other objects which will become more fully apparent from a consideration of the forms in which the gaming device may be embodied. One of these forms is more fully illustrated in the accompanying drawings and described in the following detailed description of the invention. However, it should be understood that the accompanying drawings and the detailed description are set forth only for purposes of illustrating the general principles of the invention and are not to be taken in a limiting sense.

BRIEF DESCRIPTION OF THE DRAWINGS

Figure 1:
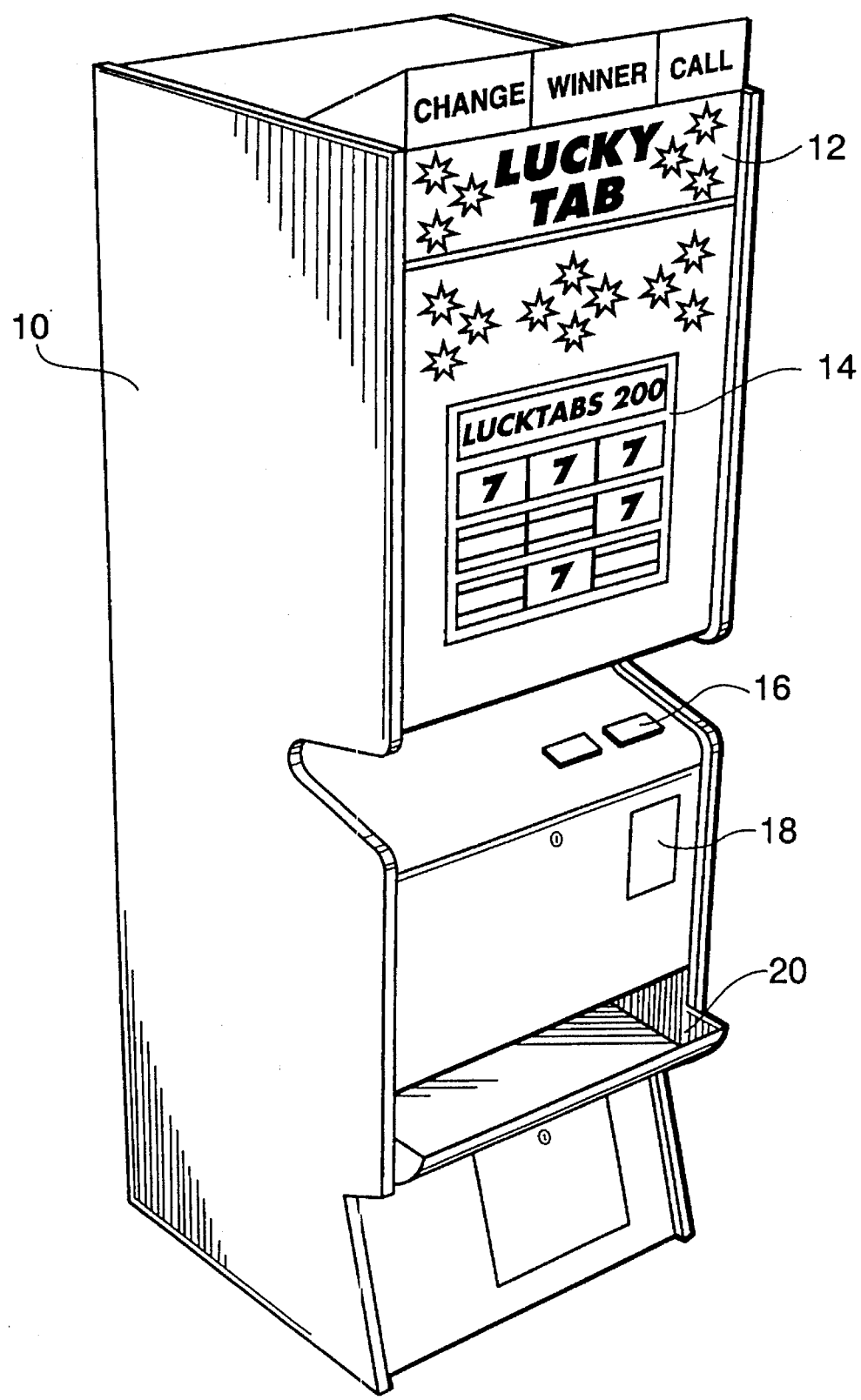
Figure 2:
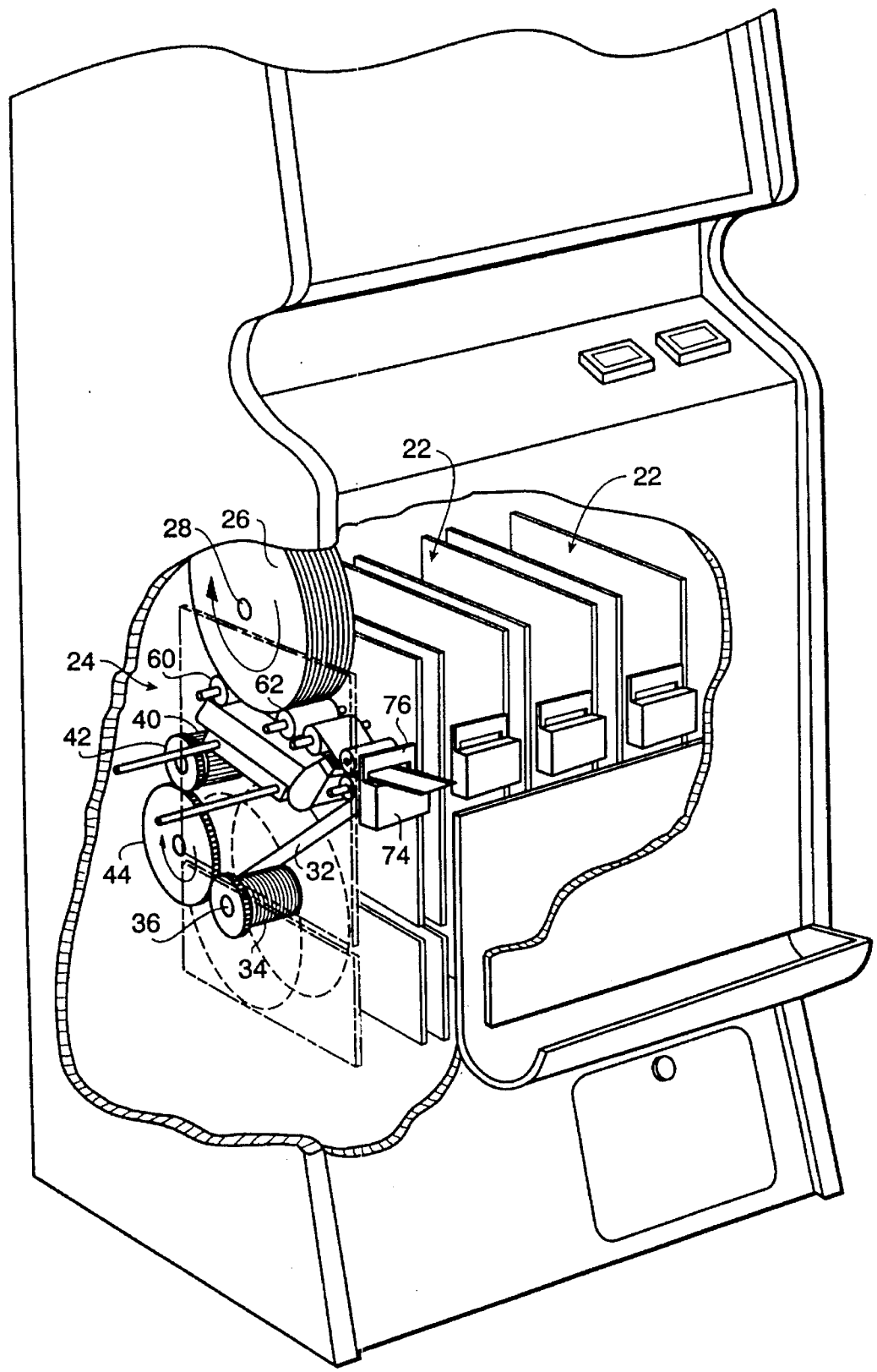
Figure 3:
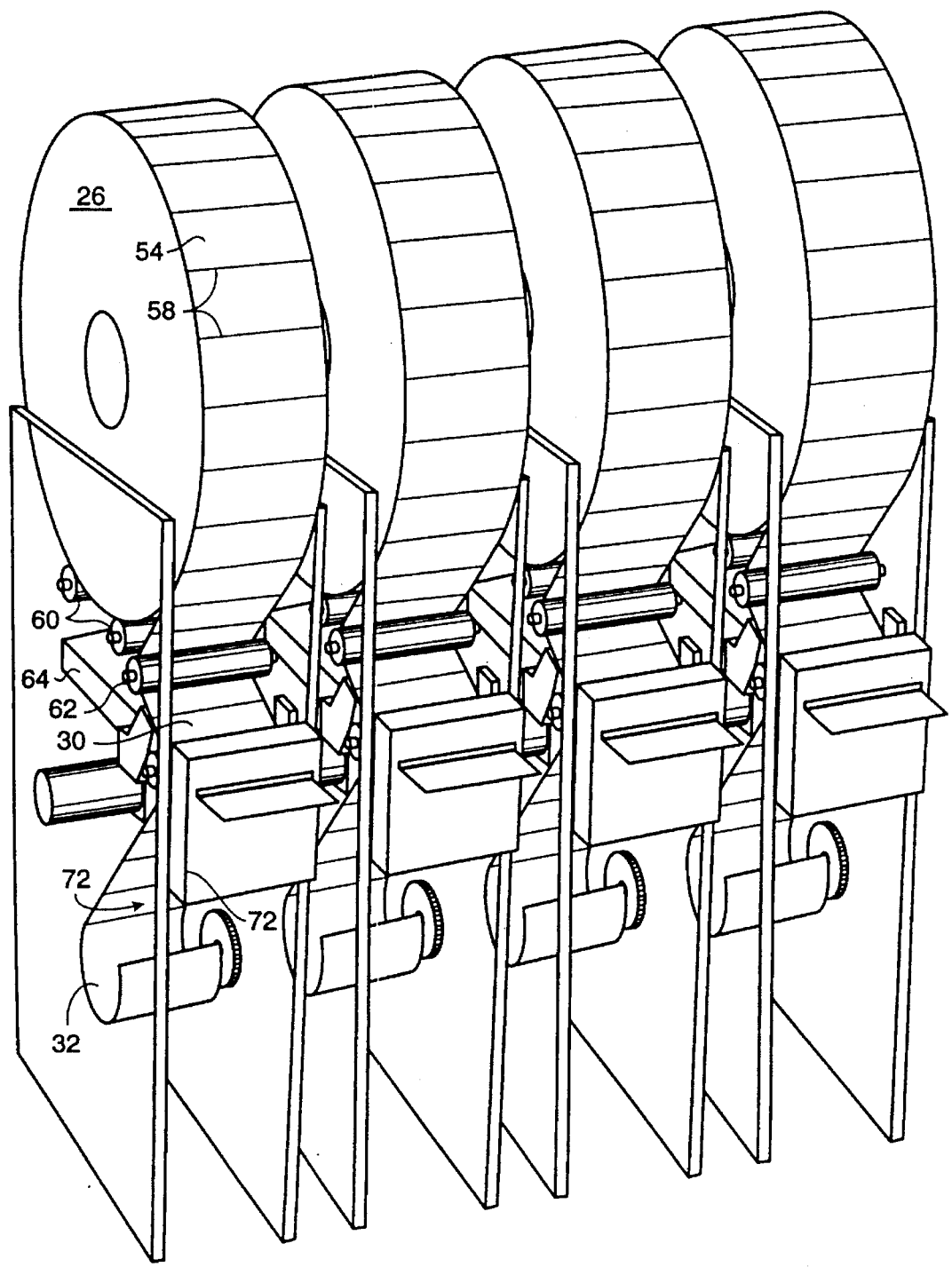
Figures 4, 5:
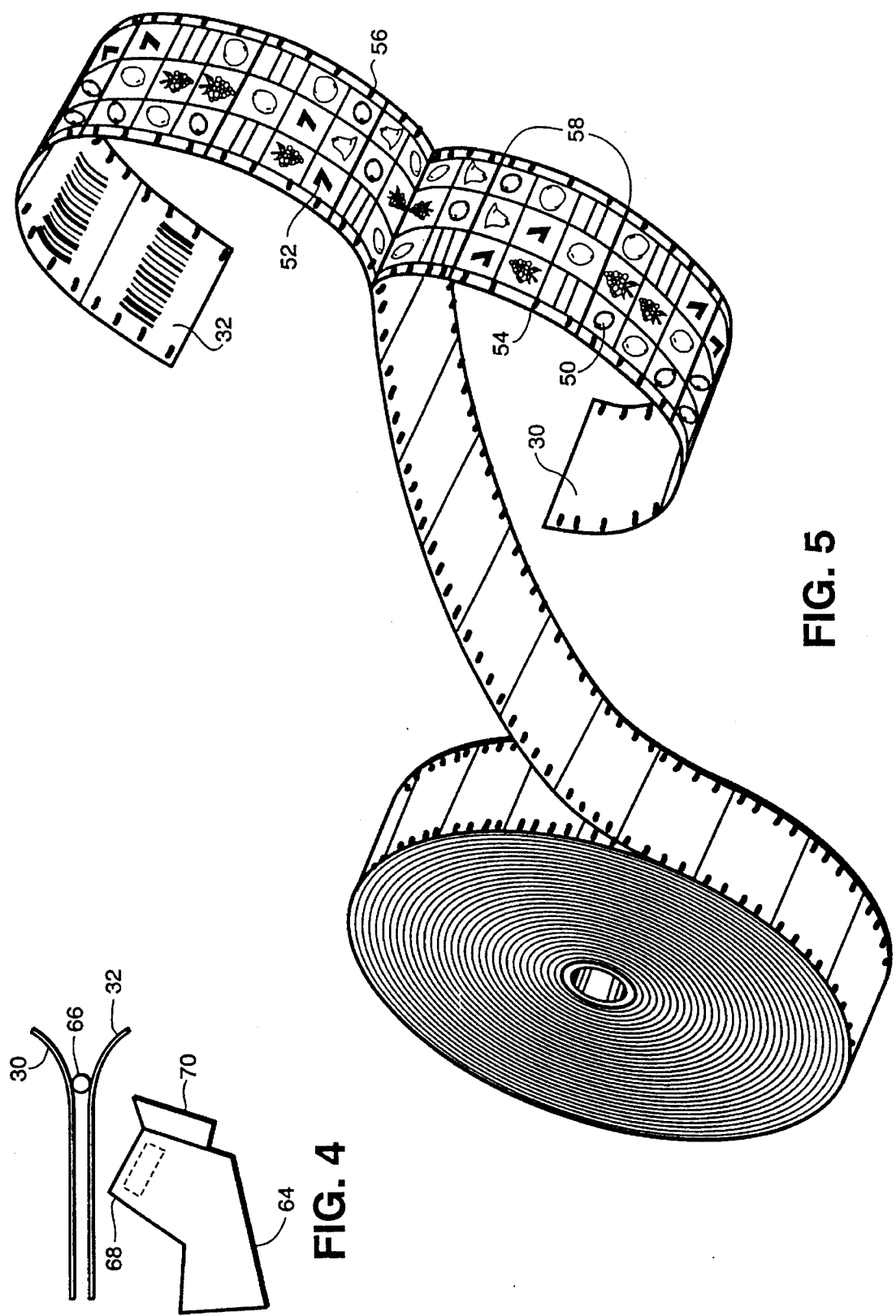

Having thus described the invention, reference will now be made to the accompanying drawings (four sheets) in which:

FIG. 1 is a perspective view of an apparatus constructed in accordance with and embodying the present invention;

FIG. 2 is a fragmentary perspective view partially broken away and in section and showing the major interior components forming part of the apparatus of the invention for severing and dispensing a strip segment along with a take-up mechanism;

FIG. 3 is an enlarged perspective view showing in detail some of the components of FIG. 2;

FIG. 4 is a side elevational view showing a portion of the scanner housing and separating mechanism forming part of the apparatus of the invention;

FIG. 5 is a perspective view of a primary and juxtaposed secondary strip;

FIG. 6 is a schematic side elevational view of a system forming part of the apparatus for displaying indicia by converting a machine readable code into displayable indicia corresponding to that on a dispensed ticket; and FIG. 7 is a schematic side elevational view, similar to FIG. 6, and showing a slightly modified form of the apparatus for reading a code and displaying indicia corresponding to that code on a series of individual pre-cut tickets.

Figure 8:
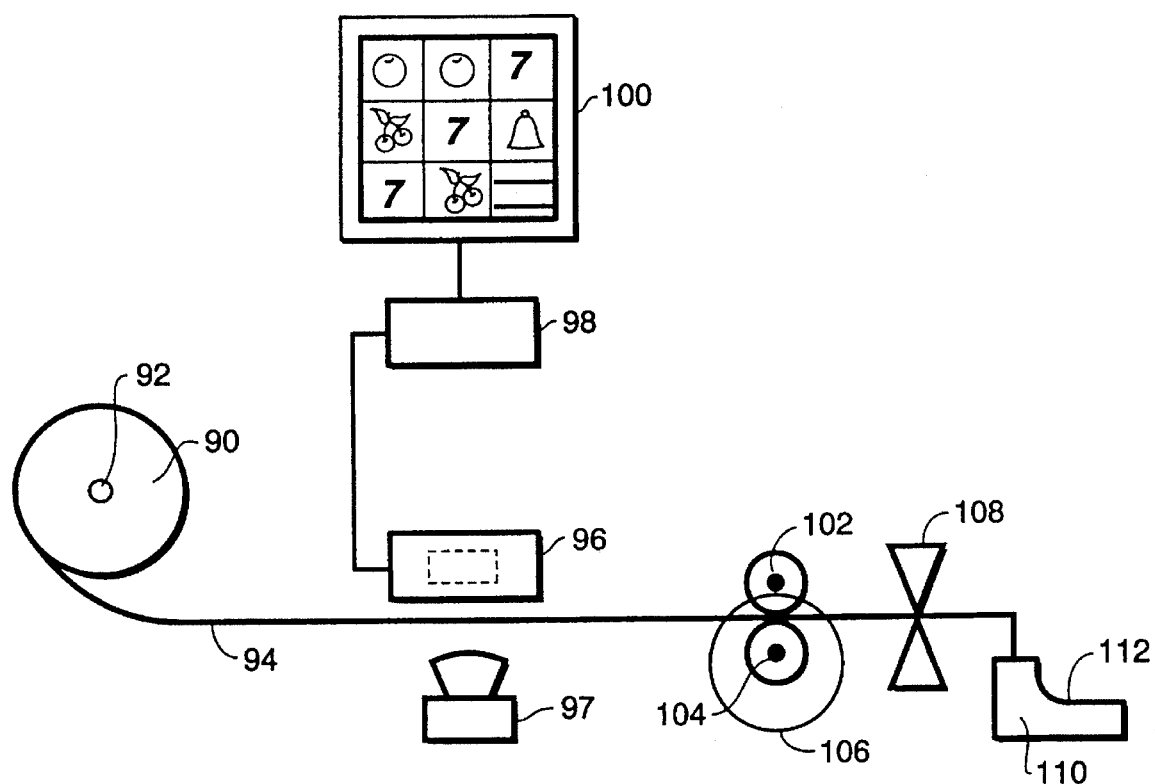

FIG. 8 is a schematic illustration of the major components of the apparatus used for the reading of the bar code and the dispensing of the ticket.

Figure 9:
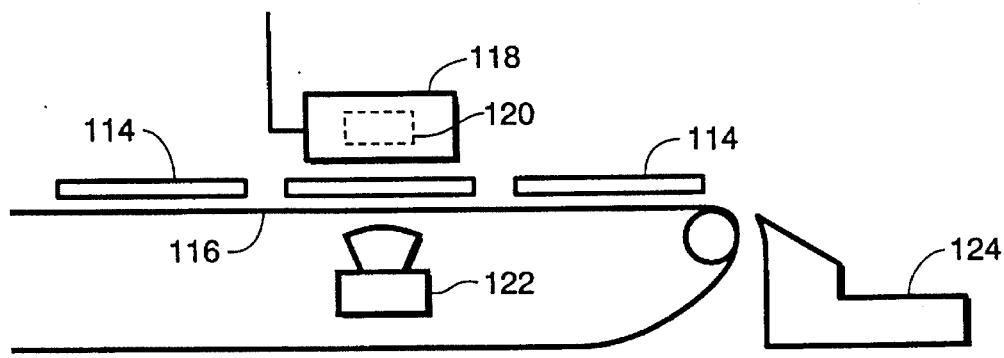

FIG. 9 is a schematic illustration of an embodiment of the invention which is similar to that embodiment of the invention shown in FIG. 8.

DETAILED DESCRIPTION OF A PREFERRED EMBODIMENT

Referring now in more detail and by reference characters to the drawings which illustrate a practical embodiment of the present invention, A designates a gaming apparatus comprised of an upstanding housing 10 having a front face 12 with a display screen 14 capable of generating display of indicia, such as numbers or symbols, on Pull-Tab tickets, or other tickets or substrates, as hereinafter described.

In one embodiment of the apparatus, the tickets which are to be dispensed are severed from a large roll containing a strip and thus, each ticket constitutes a strip segment which is severed from the end of the main strip. In another embodiment of the invention, the tickets are individual and precut, much as in the nature of a deck of cards. In each embodiment of the invention, however, each of the tickets will be provided with indicia on one face and which is covered by a removable cover strip. A machine readable code will be associated with that indicia and may be imprinted on the cover strip or it may be imprinted on the exposed face of the ticket. The apparatus of the invention, however, is primarily described in connection with the embodiment of the invention in which a segment of a strip is severed and dispensed as the individual ticket.

The housing 10 is also provided with a plurality of manually actuable keys 16 which are provided for a user to actuate the apparatus as hereinafter described. The keys represent various functions which the user may select and operate the keys according to the desired function or the desired mode of playing the game.

The gaming apparatus housing 10 is also provided with a money or currency receiver 18, which may be in the form of a coin exchanger for operating the apparatus with coins or in the form of a bill or paper currency reader. When the proper amount of money is introduced into the money receiver 18 the apparatus will be actuated to enable a play of a game and in accordance with actuation of the push button switches 16.

The money receiver 18 may be either coin operated or paper currency operated as aforesaid. In either case, these receivers are conventional in construction and therefore neither illustrated nor described in any further detail herein. However, it should be understood that the money receiver 18 is connected to a microprocessor (not shown) which is properly programmed to operate the apparatus. Thus, and in this case, when an appropriate amount of money has been received, an initiation signal will be sent to the microprocessor and the microprocessor will initiate an actuation signal permitting the apparatus to be operated.

Finally, the housing 10 is also provided with a discharge chute 20 for dispensing of Pull-Tab tickets or other type of gaming tickets and which are dispensed in accordance with the play of the gaming apparatus, as hereinafter described.

By reference to FIG. 2, it can be observed that there are a plurality of play stations 22 which may be adapted for sequential play operation or for simultaneous play operation. Thus, the user of the game apparatus may play only one of the play stations, or more than one station simultaneously, depending upon the proper actuation of the push-button switches 16 and upon deposit of the proper amount of money to play the desired number of play stations.

Referring again to FIG. 2, it can be observed that the major portions of the operating mechanism 24 of this apparatus are more fully illustrated. The apparatus comprises a supply spool 26 suitably mounted on a supply spool spindle 28. The supply spool 26 is provided with a primary strip 30 of substrate, in the form of a roll, and which may be dispensed from the supply spool. The substrate material is usually a paper or thin paper-board material, but may effectively adopt any type of rollable or bendable material such as a thin plastic strip, plasticized paper strip, or the like.

The rear face of the primary strip is disposed in facewise engagement with a marginally registered secondary strip 32 and the latter of which is connected to and trained about a take-up spool 34. The take-up spool 34 is mounted on a spindle 36 which is driven through a drive train 39 including a motor 40 rotating a drive gear 42 meshing with a spur gear 44. In this case, the motor 40 would be actuated under the control of the microprocessor (not shown) upon proper insertion of the selected amount of money and actuation of any one of the manually actuable switches 16.

The microprocessor would be connected to the money receiver so as to initiate a proper energization signal, or actuation signal, when the proper amount of money has been received in the apparatus. This type of construction in which a money receiver is connected to a microprocessor to initiate actuation of an apparatus is known, as for example, in the gaming art industry.

In accordance with the arrangement, as illustrated on FIG. 2, it can be observed that the take-up spool 34 is the primary driving member since the supply spool 26 is not driven by the motor 40. It should be understood that other means for driving the supply spool 36 may also be employed and synchronized to the motor 40, if desired.

The primary strip 30 is imprinted on its rear face with a plurality of indicia, such as indicia 50 which may be in the form of numbers, letters, graphic symbols, or the like. The indicia are preferably in the form of icons of the type conventionally used in Class 3 gaming apparatus. It can be seen, by reference to FIG. 4, that the indicia are each located in the individual indicia locations on the primary strip 54 and the like individual indicia locations 56 on the secondary strip 32. These indicia locations actually constitute discrete locations which are ultimately severed from the primary roll and constitute a ticket which is dispensed to the player of the apparatus. In the embodiment as illustrated, each indicia location 54 on the primary strip 30 is separated from the next adjacent indicia location by a pair of upper and lower horizontal lines 58. In actuality, it is not necessary for these lines to be printed on the substrate itself.

Each strip segment or ticket is equivalent to a pull-tab in the game of Pull-Tab. In the embodiment as illustrated, each strip segment or ticket is shown as being separated from the next adjacent strip segment on the strip by means of the black horizontal lines 58. In actuality, there may also be score lines at the location of each of these black upper and lower lines 58 which are printed on the substrate. Further, score lines are not necessarily required and do not have to exist as true perforations since the strip itself will be cut into the individual tickets or substrate sections in a manner to be hereinafter described in more detail. The primary strip 30 and the juxtaposed secondary or cover strip 32 initially lie in facewise contact with one another where the indicia on the rear surface of the primary strip are in facewise contact with the indicia on the forwardly facing side of the secondary strip. In this way, when the two strips are in such facewise contact, the indicia in each indicia location is essentially hidden from view. Moreover, each of the indicia location are in marginal registration with one another. Thus, each of the indicia on the primary strip are also in marginal registration with corresponding like indicia on the duplicate strip.

The supply spool 26 is supported on a pair of diametrially reduced support rollers 60, as best illustrated in FIG. 3 of the drawings. Moreover, the combined primary and duplicate strips are unwound from the supply spool 26 and trained under a pinch roller 62 which cooperates with one of the support rollers 60, in the manner as illustrated in FIG. 3. The primary strip and the juxtaposed secondary strip are then passed over a scanner housing 64, as best shown in FIGS. 3 and 4, for reasons which will presently more fully appear. Immediately after passing over the scanner housing 64, the two strips are initially separated from one another by a separating mechanism 66 which may be in the form of a simple wire or the like interposed between ends of the two strips which are separated from one another. Any mechanism which is capable of separating the two strips from their juxtaposed relationship, as shown in FIG. 4, may be employed for this purpose.

The scanner housing 64 is constructed to contain a conventional scanning element 68, such as a charge-coupled diode. However, essentially any conventional scanning element may be employed. In like manner, if desired, a light source 70 could also be located in association with the scanner housing 64 for illuminating the rear surface of the secondary or duplicate strip 32. After separation of the primary strip from the duplicate strip, as best shown in FIG. 4, the primary strip is introduced into the cutting mechanism 72, as hereinafter described in more detail. The duplicate strip 32, however, is wound as a continuous strip on the take-up roller 34.

The rear surface of the duplicate strip 32 contains a bar code in each of the discrete separate locations, as shown in FIG. 5. Accordingly, there will appear on the rear surface of the duplicate strip 32 a separate bar code representative of the indicia on the opposite surface in each indicia location. This bar code is not understandable and readily discernable by visual examination. However, when properly read and converted to corresponding indicia through the microprocessor, that indicia is in a form which can be displayed. Thus, each strip segment or ticket will have its own individual bar code corresponding to the indicia printed on the front surface thereof.

The relationship between the indicia and the bar code may be recorded in a storage mechanism and which storage mechanism can form part of the microprocessor or can be connected to and accessible by the microprocessor. In any event, the microprocessor, upon recognizing the bar code, will determine the proper indicia for display. Thereafter, the indicia is displayed on the monitor 14. In this way, the user of the apparatus will receive a ticket as hereinafter described and will also be able to observe the indicia contained on that ticket on the display screen 14.

The cutting mechanism 72 can possibly be a conventional cutting mechanism of the type which is capable of severing a plastic or like sheet strip into individual segments. Furthermore, the cutting mechanism must be electrically operable so that it can be actuated under the control of the microprocessor to sever the strip at a proper location which constitutes an upper or lower margin of each strip segment location.

In the embodiment as illustrated in FIG. 2, the cutting mechanism is in the form of a type of anvil 74 and cutting blade 76. Upon energization of the cutting mechanism as, for example, by a solenoid (not shown), the cutting blade 76 will be pulled downwardly toward the anvil 74 to literally sever a strip segment from the remaining portion of the primary strip. Therefore, upon receipt of a proper signal initiated through the microprocessor, the cutting mechanism 72 will be operated by the solenoid and sever the primary strip 30 into the individual strip segments or tickets. The tickets are thereupon allowed to deposit in the discharge chute 20 where they may be picked up by the player of the apparatus. The tickets can then be taken to a cashier or like individual for purposes of collecting the money if any of the tickets carries a winning indicia thereon.

The rear face of the primary strip 30 which contains the indicia will actually be disposed in intimate facewise contact with the forward face of the duplicate strip 32. Thus, the indicia on the primary strip will not be initially observable until the apparatus separates the duplicate strip from the primary strip and dispenses the strip segment. The rear face of the duplicate strip will contain the bar code 56, as aforesaid, and this bar code is only machine readable, that is, it cannot be intelligibly read by a user or observer of the apparatus. The indicia, therefore, will not be intelligible to the player or observer until the apparatus dispenses the ticket or displays the symbols corresponding to the bar code, or both.

FIGS. 6 and 7 illustrate a slightly modified form of ticket-containing strip assembly 80 and which includes a strip 82 and a removable cover or backing 84. In this case, the strip 82 is also subdivided into individual strip sections 86 which may be severed from the end of the continuous strip to provide individual tickets. The strip segments 86 are also provided with indicia on the surface thereof which is covered by the cover strip 84, as also best illustrated in FIG. 6.

The rear surface of the strip 82 is provided with machine readable codes, such as bar code sections 88, for each of the individual strip sections 86. In this way, the rear or exposed side of the strip 82 will have the bar code located to be read by a scanner. The cover strip 84 will have no markings whatsoever which will co-act with the apparatus of the invention.

In connection with the present invention, it should be understood that one of the important aspects is that individual tickets, such as the strip segments which are severed from the strip, will have indicia on one surface, such as icons, and in association therewith, a bar code will be provided for each such ticket or strip segment. Moreover, the indicia or icons will be covered by a removable strip 84. This is essentially true in all embodiments of the invention so that the player of the game can examine the dispensed ticket in order to determine if the indicia represents a winning of the game. Furthermore, the bar code, in association with the indicia for that ticket, will also be simultaneously read and displayed on a monitor of the apparatus.

FIG. 8 presents a schematic illustration of the major components of the apparatus used for the reading of the bar code and the dispensing of the ticket. In this embodiment, the ticket is severed from the end of a strip presented in the form of a roll 90 mounted on a spool 92. The strip 94 is passed under a scanner 96 and which may operate in conjunction with a light source 97. The scanner will scan the bar code of each strip segment passed under the scanner 96 and will transmit the information read from the strip to a microprocessor 98. The microprocessor 98 will, in turn, cause a generation of a display on a monitor 100 and which display will represent the actual indicia presented on the ticket itself. It should be understood, however, that the display could also provide additional information about that particular ticket or information about the ticket in place of the actual indicia.

The strip, as shown in FIG. 8, is moved through an idler roller 102 and a lower drive roller 104, the latter of which is powered by a motor 106. A cutting mechanism 108 is provided for cutting the ends of a strip segment to form an individual ticket and a ticket 110 is dropped into a discharge chute 112.

FIG. 9 illustrates an embodiment of the invention which is similar to that embodiment of the invention shown in FIG. 8. In this case, individual precut tickets, such as substrates in the nature of playing cards, are provided and are dispensed in any conventional manner from a stack or bin of these tickets. The individual tickets 114 in FIG. 9 are moved along a conveyer 116 under a scanner 118, as shown, and which contains a scanning element 120. The scanner 118 may operate in conjunction with a light source 122, as also shown. The scanner 120 is further connected to a microprocessor and a monitor, such as the microprocessor 98 and the monitor 100.

After the ticket 114 has been scanned, it will then be dispensed into a dispenser 124. In this embodiment of the invention, each ticket is very similar to the strip segment 86, as shown in FIG. 6. Thus, it is, in effect, the same as the strip segment 86 with indicia on one surface and a bar code on the opposite surface. Moreover, it is also covered by a releasible cover strip, such as the cover strip 84.

Thus, it can be seen that each of the tickets are actually pre-printed, both with the indicia and with the bar code, whether or not the bar code appears on the tickets, or on the cover strip associated with the tickets. Moreover, the invention is effective for tickets which are severed from strip or whether they are precut. In each case, the tickets will contain the indicia and information about that indicia will be determined from the bar code which is only machine readable and the indicia thereupon recreated for display on the monitor of the apparatus.

The gaming apparatus and method of the present invention are highly effective in simulating or otherwise automating the conventional game of Pull-Tab, as aforesaid. In this case, and in a conventional Pull-Tab game, the player removes the opaque cover sheet on the tap so that he or she can examine the indicia to thereby determine if that player was or was not a winner. In the game apparatus of the present invention, essentially the same operation is taking place. However, rather than having a dealer select a Pull-Tab or substrate in a random location from a box of like tabs, the apparatus of the invention literally dispenses the next randomly located Pull-Tab or discrete primary strip location. No player, or any other party operating the machine or anyone else, for that matter, will know what indicia is contained on the ticket dispensed to the player until that indicia is either displayed or read from the ticket, or both.

The apparatus of the invention also closely simulates the game of Pull-Tab in that the duplicate strip 32 actually functions as a type of cover strip or opaque substrate. However, as opposed to having the player remove the cover sheet, the apparatus performs that function for the player. Thus, and in this respect, the apparatus of the present invention is highly effective in that it almost completely simulates, or otherwise automates, the game of Pull-Tab and does not detract from any of the features of the game itself.

Thus, there has been illustrated and described a unique and novel electronic gaming apparatus and a method of use therefor which fulfills all of the objects and advantages which have been sought. It should be understood tat many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by Letters Patent is:

1. An electronic gaming apparatus capable of dispensing gaming tickets containing indicia thereon upon actuating the apparatus and where indicia on certain of the gaming tickets represent winning indicia, said apparatus comprising:

a) a ticket substrate having a first surface and an oppositely disposed second surface;

b) indicia used in the play of the game on the first surface of said ticket;

c) an opaque cover strip disposed over the indicia precluding view of the indicia until removal of the cover strip;

d) means for dispensing the ticket upon actuation of the apparatus;

e) a code associated with said ticket which is machine readable and not readily discernable by visual examination;

f) means associated with said apparatus for reading a code corresponding to the indicia on the ticket which is being dispensed; and g) means for displaying information relating to indicia generated from the code on the ticket which is dispensed.

2. The electronic gaming apparatus of claim 1 further characterized in that said code is on the removable cover strip.

3. The electronic gaming apparatus of claim 1 further characterized in that said code is on the second side of the ticket.

4. The electronic gaming apparatus of claim 1 further characterized in that the means for displaying presents the same indicia as that on the ticket being dispensed.

5. The electronic gaming apparatus of claim 4 further characterized in that the means for displaying is a computer monitor.

6. The electronic gaming apparatus of claim 1 further characterized in that the indicia and the code are pre-printed on the tickets.

7. The electronic gaming apparatus of claim 1 further characterized in that each said ticket is a segment of a large strip containing a number of such tickets and that said apparatus comprises a cutting means which cuts the ticket from the strip after actuation of the apparatus.

8. The electronic gaming apparatus of claim 1 further characterized in that said tickets are pre-cut.

9. An electronic gaming apparatus capable of dispensing a ticket containing indicia thereon used in the play of a game of chance upon actuating the apparatus and simultaneously displaying the indicia on the dispensed ticket, said apparatus comprising:

a) a ticket containing indicia thereon;
   b) means for releasibly covering the indicia on said ticket;
   c) a machine readable code associated with the indicia on the ticket and such code being correlated to the indicia on the ticket, information contained in said machine readable code not being readily discernable by visual examination;
   d) means for reading the machine readable code of each ticket which is dispensed; and
   e) means connected to said means for reading simultaneously displaying indicia corresponding to that on the dispensed ticket.

10. The electronic gaming apparatus of claim 9 further characterized in that the means for displaying is a display screen on said apparatus for displaying the indicia.

11. The electronic gaming apparatus of claim 10 further characterized on that the machine readable code corresponding to the indicia is imprinted on an opposite side of the ticket which contains the indicia and the means for reading is a scanning means which scans the code for conversion to display the indicia.

12. The electronic gaming apparatus of claim 11 further characterized in that the apparatus comprises advancing means for moving a ticket through the apparatus, said advancing means is connected to a money receipt mechanism and is actuated only when a selected amount of money is deposited in the apparatus.

13. The electronic gaming apparatus of claim 12 further characterized in that the gaming apparatus aids in the game of Pull-Tab and each dispensed ticket constitutes a separate Pull-Tab.

14. A method of playing a game of chance where a player obtains a ticket containing indicia and in which the player will win a game if the indicia on the ticket corresponds to winning indicia, said method comprising:

a) actuating an apparatus containing a plurality of tickets with each ticket containing indicia thereon and only a limited number of the tickets containing winning indicia thereon;
   b) advancing the ticket through the apparatus along with a cover strip disposed and in juxtaposed relation to the indicia on the ticket;
   c) dispensing the selected discrete ticket having indicia thereon to the player of the apparatus; and
   d) simultaneously displaying the indicia on the ticket on a display screen on the apparatus.

15. The method of claim 14 further characterized in that the method comprises scanning a machine readable code on the ticket by the apparatus and thereafter causing a display of the indicia contained on the ticket on a monitor of the apparatus.

16. The method of claim 15 further characterized in that said method comprises randomly locating tickets containing the winning indicia throughout a large number of tickets.

17. An electronic gaming apparatus capable of dispensing gaming tickets containing indicia thereon upon actuating the apparatus and where indicia on certain of the gaming tickets represent winning indicia, said apparatus comprising:

a) a ticket substrate having a first surface and an oppositely disposed second surface;
   b) indicia used in the play of the game on the first surface of said ticket;
   c) means for dispensing the ticket upon actuation of the apparatus;
   d) a code associated with said ticket which is machine readable and not readily discernable by visual examination and which code is correlated to the indicia on that ticket;
   e) means associated with said apparatus for reading the code correlated to the indicia on the ticket which is being dispensed; and
   g) means for displaying information generated from the code on the ticket which is dispensed.

18. The electronic gaming apparatus of claim 17 further characterized in that said code is on the second side of the ticket.

19. The electronic gaming apparatus of claim 17 further characterized in that the means for displaying presents the same indicia as that on the ticket being dispensed.

20. The electronic gaming apparatus of claim 19 further characterized in that the means for displaying is a computer monitor.

21. The electronic gaming apparatus of claim 17 further characterized in that the indicia and the code are pre-printed on the tickets.

22. The electronic gaming apparatus of claim 17 further characterized in that each said ticket is a segment of a large strip containing a number of such tickets and that said apparatus comprises a cutting means which cuts the ticket from the strip after actuation of the apparatus.

23. The electronic gaming apparatus of claim 17 further characterized in that said tickets are pre-cut.

24. A method of playing a game of chance where a player obtains a ticket containing indicia and in which the player will win a game if the indicia on the ticket corresponds to winning indicia, said method comprising:

a) actuating an apparatus containing a plurality of tickets with each ticket containing indicia thereon and only a limited number of the tickets containing winning indicia thereon;
   b) advancing the ticket through the apparatus for ultimate dispensing thereof;
   c) dispensing the selected discrete ticket having indicia thereon to the player of the apparatus; and
   d) simultaneously displaying the indicia on the ticket on a display on the apparatus.

25. The method of claim 24 further characterized in that the method comprises scanning a machine readable code on the ticket by the apparatus and thereafter causing a display of the indicia contained on the ticket on a monitor of the apparatus.

* * * * *